(12) United States Patent
Johnson (10) Patent No.: US 10,569,689 B2
(45) Date of Patent: Feb. 25, 2020

(54) RECONFIGURABLE CHOCK ASSEMBLY

(71) Applicant: Corey Barnett Johnson, Hyrum, UT (US)

(72) Inventor: Corey Barnett Johnson, Hyrum, UT (US)

( * ) Notice: Subject to any disclaimer, the term of this patent is extended or adjusted under 35 U.S.C. 154(b) by 9 days.

(21) Appl. No.: 15/598,250

(22) Filed: May 17, 2017

(65) Prior Publication Data

US 2018/0334073 A1    Nov. 22, 2018

(51) Int. Cl.
| | | |
|---|---|---|
| *B60P 7/08* | (2006.01) | |
| *B60P 3/077* | (2006.01) | |
| *B60P 3/06* | (2006.01) | |
| *B60P 3/07* | (2006.01) | |
| *B60P 3/075* | (2006.01) | |
| *B60P 3/073* | (2006.01) | |
| *B60P 3/079* | (2006.01) | |
| *B60R 9/10* | (2006.01) | |
| *B62H 3/08* | (2006.01) | |
| *B62H 3/04* | (2006.01) | |
| *B60T 3/00* | (2006.01) | |
| *B60R 9/00* | (2006.01) | |
| *B60R 9/06* | (2006.01) | |
| *B60R 9/08* | (2006.01) | |

(52) U.S. Cl.
CPC ............. *B60P 3/077* (2013.01); *B60P 3/06* (2013.01); *B60P 3/07* (2013.01); *B60P 3/073* (2013.01); *B60P 3/075* (2013.01); *B60P 3/079* (2013.01); *B60P 7/0892* (2013.01); *B60R 9/00* (2013.01); *B60R 9/06* (2013.01); *B60R 9/08* (2013.01); *B60R 9/10* (2013.01); *B60T 3/00* (2013.01); *B62H 3/04* (2013.01); *B62H 3/08* (2013.01)

(58) Field of Classification Search
CPC ......... B60P 3/077; B60P 7/0892; B60P 7/135; B60P 3/079; B60P 3/073; B60P 3/075; B60P 3/07; B60P 3/06; B60R 9/00; B60R 9/10; B60R 9/06; B60R 9/08; B60T 3/00; B62H 3/04; B62H 3/08
USPC ......... 410/2–4, 7–12, 19–21, 23, 30, 49, 50; 211/19, 20, 23, 24; 188/32
See application file for complete search history.

(56) References Cited

U.S. PATENT DOCUMENTS

| | | | | |
|---|---|---|---|---|
| 1,411,531 A | * | 4/1922 | Stipes | B60P 3/077 188/32 |
| 5,807,047 A | * | 9/1998 | Cox | B60P 7/15 410/143 |
| 5,971,685 A | | 10/1999 | Owens | 410/151 |

(Continued)

*Primary Examiner* — Stephen T Gordon
(74) *Attorney, Agent, or Firm* — Michael R. Schramm (57) ABSTRACT

A reconfigurable chock assembly for securing a motorcycle or other two wheeled vehicle in a trailer, truck bed or other similar arrangement. The chock assembly including a left wing and right wing connected by a plate to thereby engage the wheel of the motorcycle both above and below the axle and inhibit movement and tipping during transportation as well as when stationary. An attachment bracket includes clips designed to engage a track installed on the wall of the trailer or truck bed box. The track includes a plurality of slots to engage the clips allowing for the chock assembly to be located at reconfigurable locations along the length of the track. The attachment bracket allows the chock assembly to be quickly and easily repositioned along the length of the track.

3 Claims, 8 Drawing Sheets

(56) References Cited

U.S. PATENT DOCUMENTS

| | | | |
|---|---|---|---|
| 6,331,094 B1 * | 12/2001 | Burrows | B60P 3/077 410/3 |
| 6,675,980 B2 | 1/2004 | Ehrgott | 211/189 |
| 6,729,485 B2 | 5/2004 | Ehrgott | 211/189 |
| 6,966,734 B2 * | 11/2005 | Toteff | B60P 3/077 410/104 |
| 7,416,373 B2 * | 8/2008 | Mock | B60P 3/079 410/100 |
| 8,028,845 B2 | 10/2011 | Himes | 211/103 |
| 8,439,612 B2 | 5/2013 | Chamoun | 410/121 |
| 8,690,503 B2 | 4/2014 | Chamoun | 410/121 |
| 9,346,392 B1 | 5/2016 | Neal et al. | B60P 7/0815 |
| 9,505,333 B2 * | 11/2016 | Jobe | B60R 9/06 |
| 2002/0117464 A1 | 8/2002 | Ehrgott | 211/189 |
| 2002/0117465 A1 | 8/2002 | Ehrgott | 211/189 |
| 2005/0019126 A1 * | 1/2005 | Pingel | B60P 3/077 410/30 |
| 2006/0108297 A1 * | 5/2006 | Gay | B62H 3/04 211/20 |
| 2008/0185489 A1 | 8/2008 | Ehrgott | 248/224.7 |
| 2009/0120888 A1 | 5/2009 | Himes | 211/103 |
| 2012/0257943 A1 | 10/2012 | Chamoun | 410/122 |
| 2014/0360957 A1 | 12/2014 | Himes | B60P 7/0815 |
| 2016/0167717 A1 | 6/2016 | Marchlewski et al. | B62D 33/0207 |
| 2016/0207441 A1 | 7/2016 | Khan | B60P 7/15 |

* cited by examiner

RECONFIGURABLE CHOCK ASSEMBLY

BACKGROUND

Transportation of two wheeled vehicles, such as motorcycles and bicycles, in trailers and pickup truck beds is a common occurrence. Riders desire to transport their motorcycle or bicycle to a recreation area in a pickup truck or trailer without damage to the motorcycle, bicycle, pickup truck or trailer. Various chock systems have been developed to allow for transportation of motorcycles or bicycles in pickup truck beds or trailers. Many traditional chock systems utilize a chock attached to a pickup truck bed or to the floor of a trailer. Other chock systems utilize spacers which are installed such that they extend from a vertical wall or surface in a pickup truck bed or trailer. Typically, these systems require significant time and effort to install and de-install. The stability and support provided by these chock systems varies significantly depending on specific design and is often inadequate particularly for motorcycles which tend to be large and heavy. Additionally, such systems are not typically easily reconfigurable. Numerous users find existing chock systems do not adequately chock their motorcycle or bicycle in their pickup truck bed or trailer.

BRIEF DESCRIPTION OF THE DRAWINGS

The accompanying drawings illustrate various examples of the exemplary embodiments described herein and are a part of the specification. The illustrated exemplary embodiments are merely examples and do not limit the scope of the claims.

Throughout the drawings, identical and like reference numbers designate similar, but not necessarily identical, elements.

DETAILED DESCRIPTION

Throughout this description and in the accompanying drawings reference is made to principles of the invention through the use of exemplary embodiments. It should be understood that the application is not limited to the details or specific methodologies set forth herein. It should also be understood that the terminology used herein is for the purpose of description only and should not be regarded as limiting.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

Figure 1:
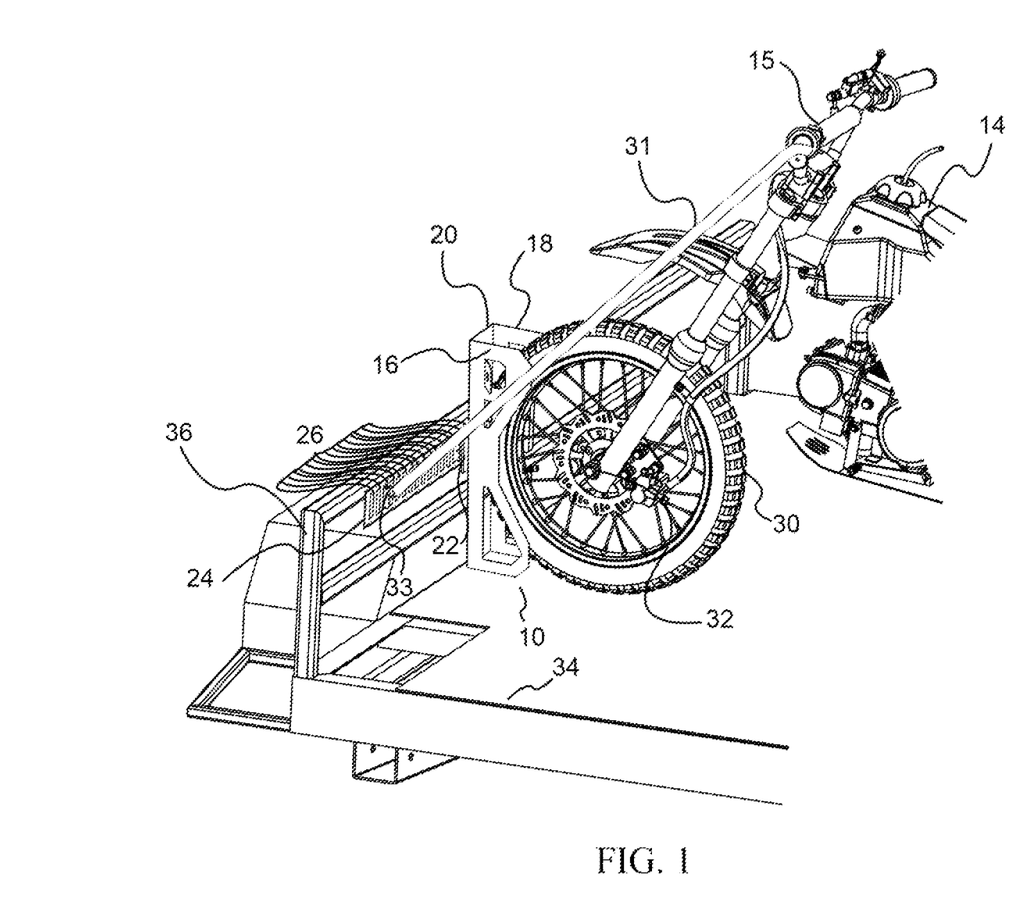
FIG. 1 is a side perspective view of a chock system installed in a trailer according to an exemplary embodiment described herein.

Referring initially to FIG. 1 an exemplary embodiment of the overall reconfigurable chock system (10) taught by the invention is shown installed in a trailer (34) and engaging a motorcycle (14). In the reconfigurable chock system (10), the chock comprises a left wing (16) and a right wing (18) joined by plate (20). In this exemplary embodiment left wing (16), right wing (18) and plate (20) are made of a single sheet of material however it will be appreciated that the same effect could be accomplished using individual portions joined together.

Chock (10) further comprises an attachment assembly (22) which allows chock (10) to be attached to track (24) at any one of a number of predetermined attachment points (26) along track (24). As shown, attachment assembly (22) attaches chock (10) to track (24) such that motorcycle (14) is generally perpendicular to left trailer side wall (36) and right trailer side wall (not shown). It will be understood that chock (10) could also be installed to engage track (24) installed on trailer front wall (not shown) such that motorcycle (14) would be parallel to left trailer side wall (36) and right trailer side wall (not shown).

In use, left wing (16) and right wing (18) of chock (10) surround front motorcycle wheel (30) both above and below front axle (32). Engaging front motorcycle wheel (30) both above and below front axle (32) provides for stability during transportation that inhibits tipping of motorcycle (14) either to the left or to the right. As shown, motorcycle (14) would normally be particularly prone to tipping on acceleration or deceleration of trailer (34). Strap (31) engages attachment point (33) which is affixed to track (24) and to motorcycle handle bar (15). In this way, strap (31) further stabilizes motorcycle (14) in transit. A similar strap arrangement (not shown) engages motorcycle (14) on the opposite side. It will be understood that a similar installation could be employed by engaging the rear wheel of a motorcycle, bicycle, or other two-wheeled vehicle.

Figure 2:
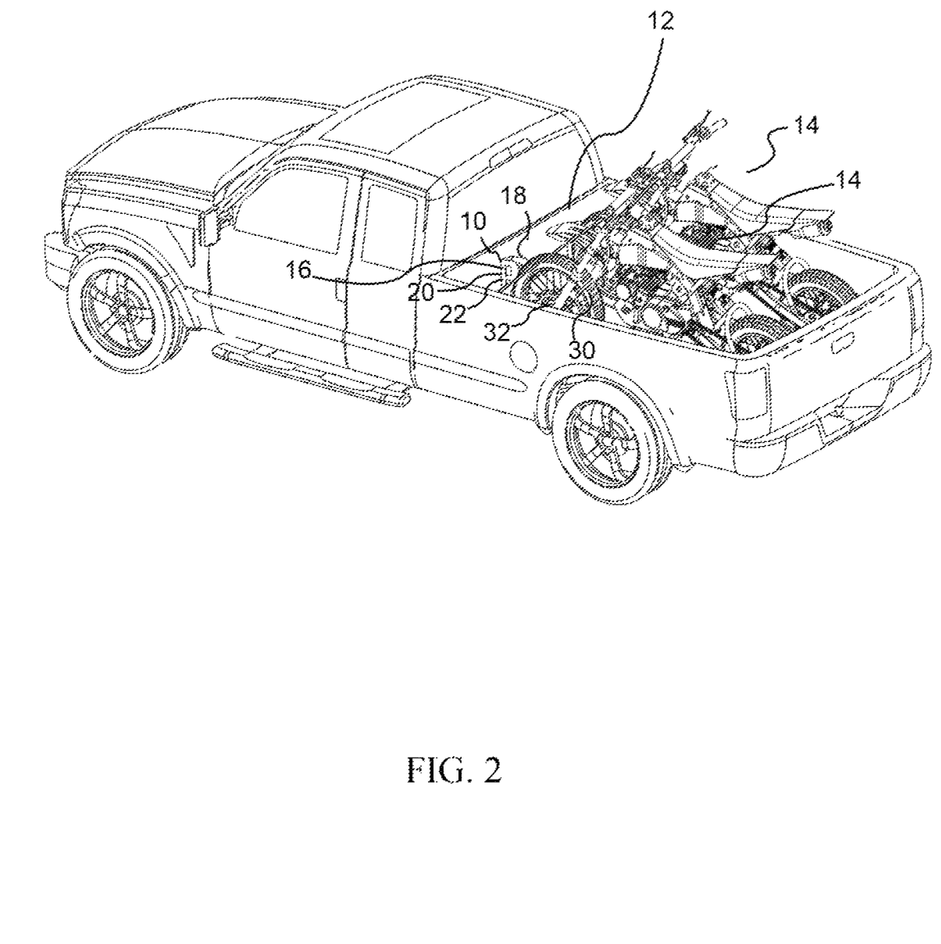
FIG. 2 is a top perspective view of a chock system installed on the front wall of a pickup truck bed box according to an exemplary embodiment described herein.

Referring to FIG. 2, an exemplary embodiment of the overall reconfigurable chock system (10) taught by the invention is shown installed on a front wall of a pickup truck bed box (12) and engaging a motorcycle (14). In the reconfigurable chock system (10), the chock comprises a left wing (16) and a right wing (18) joined by plate (20). In this exemplary embodiment left wing (16), right wing (18) and plate (20) are made of a single sheet of material however it will be appreciated that the same effect could be accomplished using individual portions joined together.

Chock (10) further comprises an attachment assembly (22) which allows chock (10) to be attached to track (24) at any one of a number of predetermined attachment slots (26) along track (24). Attachment assembly (22) attaches chock (10) to track (24) such that chock (10) is generally perpendicular to front pickup truck bed box wall (12).

In use, left wing (16) and right wing (18) of chock (10) surround front motorcycle wheel (30) both above and below front axle (32). Engaging front motorcycle wheel (30) both above and below front axle (32) provides for stability during transportation that inhibits tipping of motorcycle (14) either to the left or to the right. It will be understood that a similar installation could be employed by engaging the rear wheel of a motorcycle, bicycle, or other two-wheeled vehicle.

Referring to FIGS. 3-7, an exemplary embodiment of the chock assembly is shown generally at 100. Specifically, in regard to FIGS. 3-4, right wing (106) and left wing (108) are joined by plate (120). In this exemplary embodiment, right wing (106) includes right upper cut out (140) and right lower cut out (142) and left wing (108) includes left upper cut out (148) and left lower cut out (150). Right wing (106) also includes partial cutout (146) which forms tab (144) which includes hole (170). Similarly, left wing (108) includes partial cutout (154) which forms tab (152) which includes hole (172).

Figure 3:
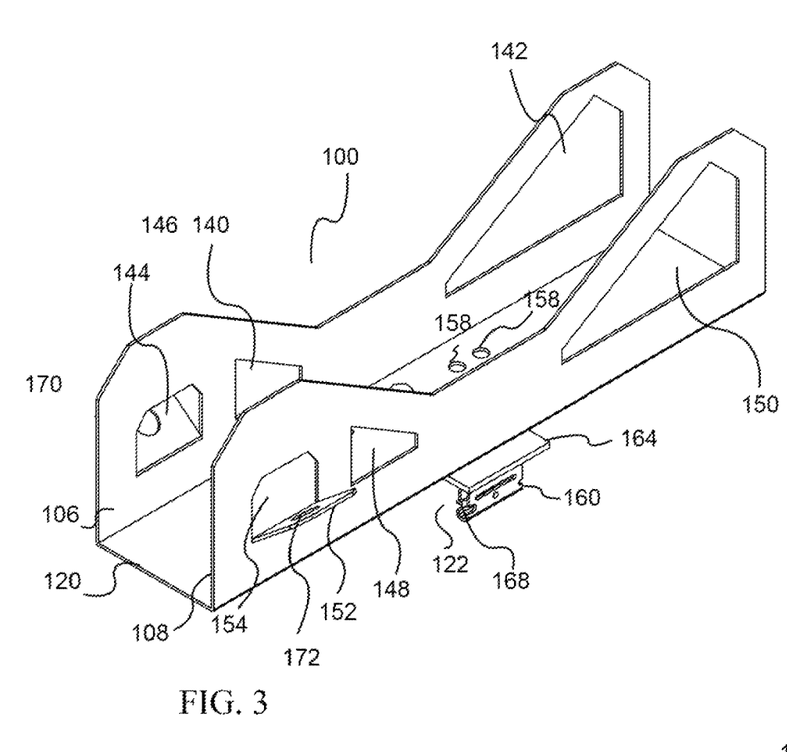
FIG. 3 is a perspective view of a chock assembly according to an exemplary embodiment described herein.
Figure 4:
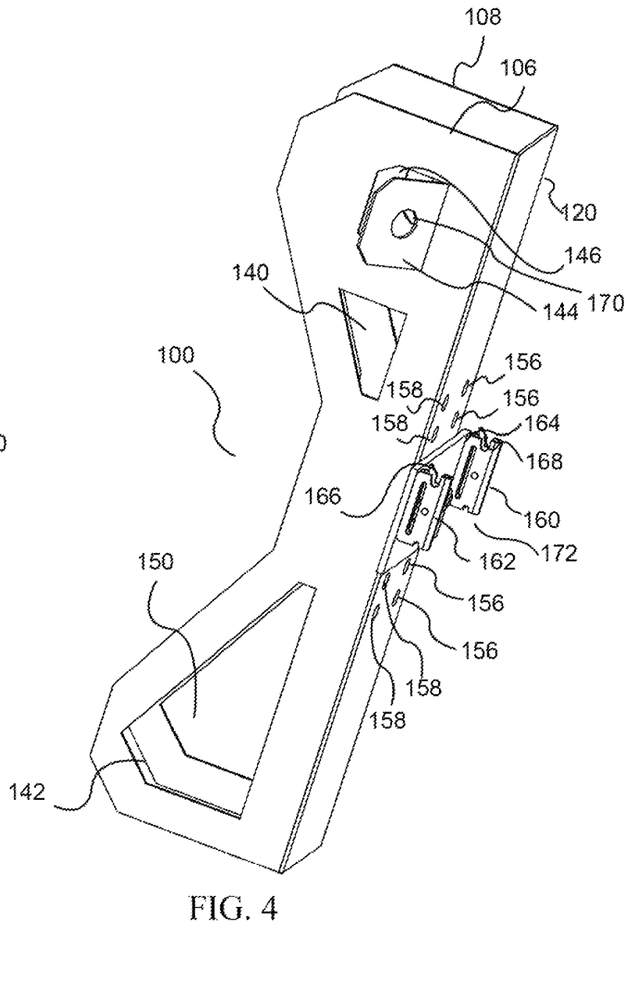
FIG. 4 is a perspective side view of a chock assembly according to an exemplary embodiment described herein.
Figure 5:
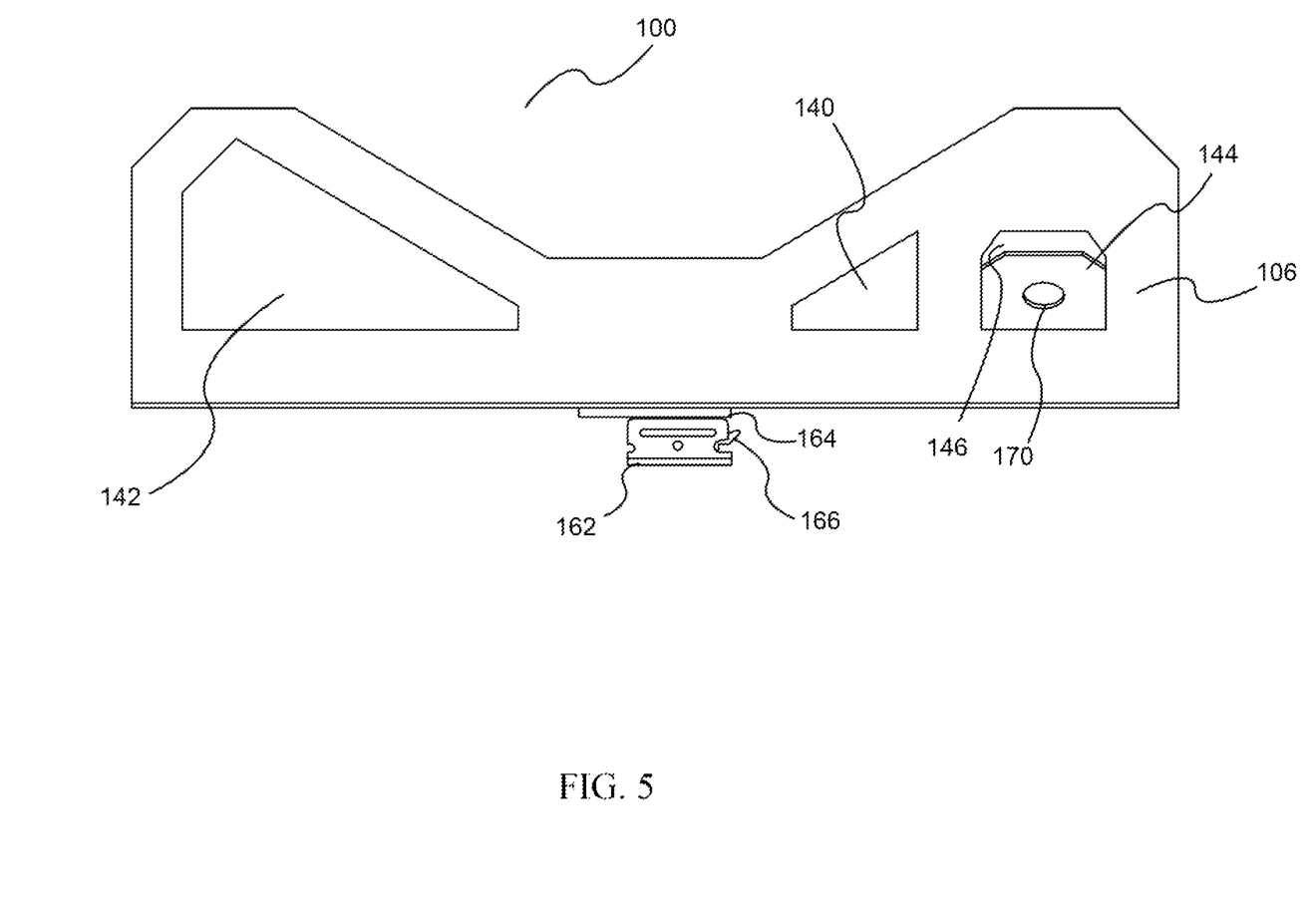
FIG. 5 is a side view of a chock assembly according to an exemplary embodiment described herein.
Figure 6:
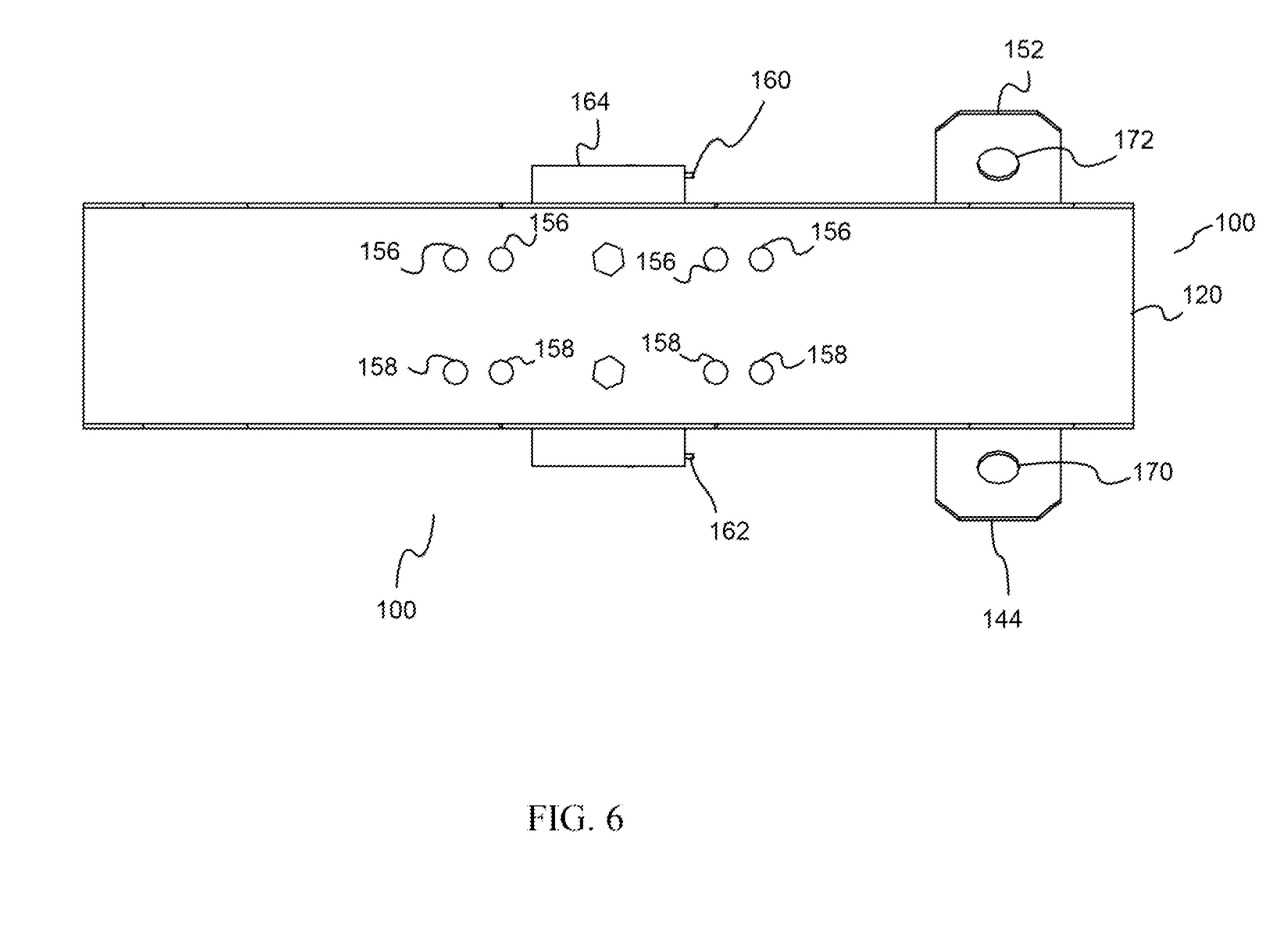
FIG. 6 is a front view of a chock assembly according to an exemplary embodiment described herein.
Figure 7:
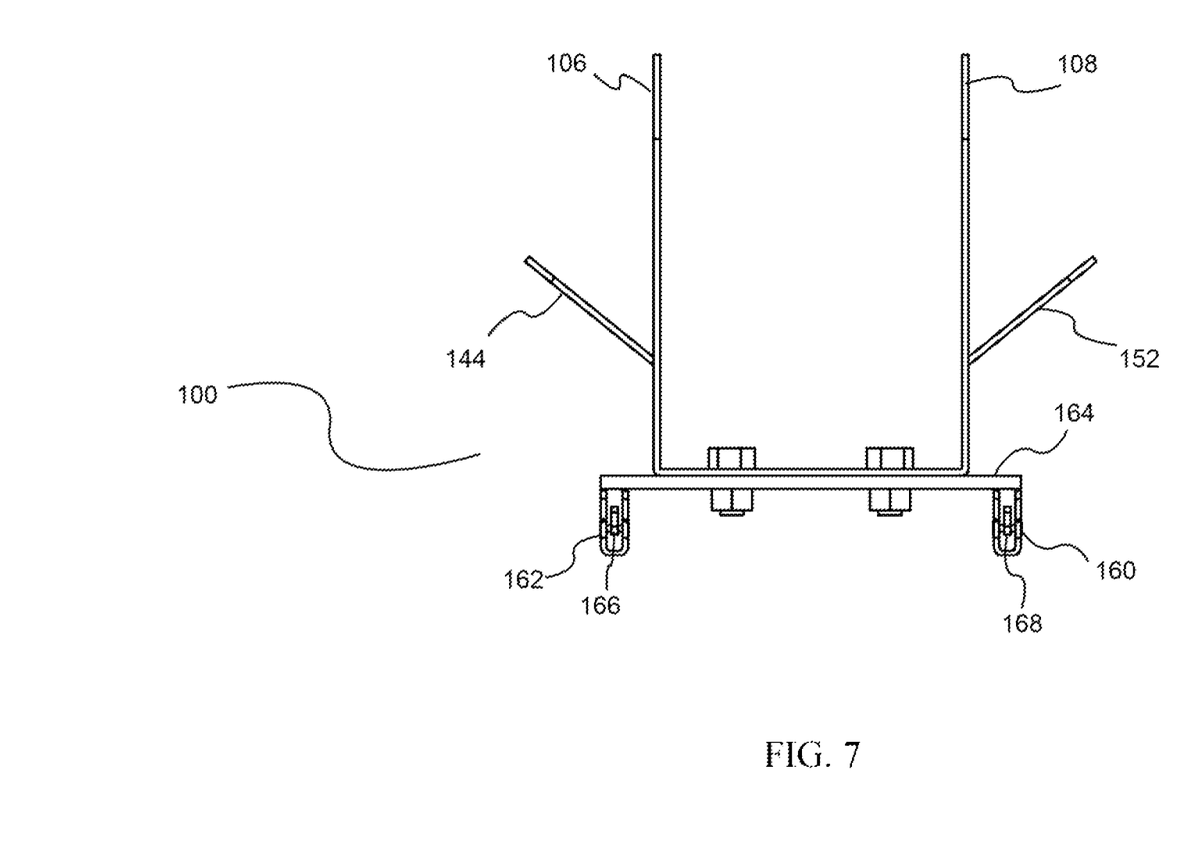
FIG. 7 is a top view of a chock assembly according to an exemplary embodiment described herein.

Left tab (152) and right tab (144) are angled out from left wing (108) and right wing (106) respectively to allow for the use of attachment mechanisms such as tie downs, bungee cords, rope, or other attachment mechanism (not shown). The angle of left tab (152) and right tab (144) can be adjusted to optimize the use of a specific attachment mechanism as desired.

Plate (120) joining left wing (108) and right wing (106) may include a plurality of left attachment bracket holes (156) and right attachment bracket holes (158). The attachment bracket holes (156, 158) can be used to locate attachment bracket (122) as desired. In this way, the engagement of left wing (108) and right wing (106) with motorcycle or other vehicle wheel (not shown) maybe optimized.

Figure 8:
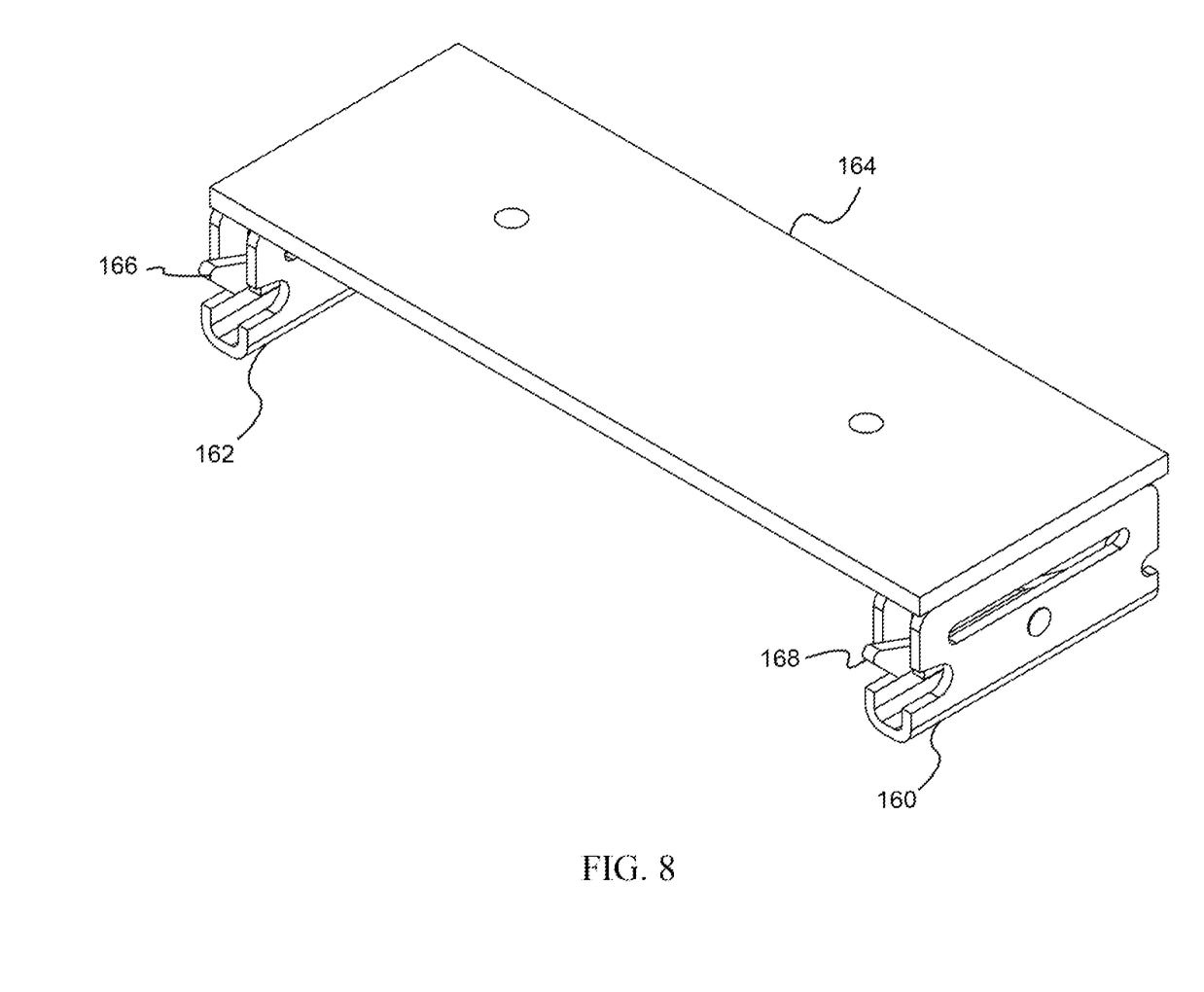
FIG. 8 is a perspective view of an attachment apparatus according to an exemplary embodiment described herein.

Attachment bracket (122) includes left clip (160) and right clip (162). Left clip (160) and right clip (162) are separated by attachment bracket plate (164). The clips (160, 162) engage the track (not shown) through slots in the track (not shown).

In this embodiment, attachment bracket plate (164) is somewhat wider than plate (120). This width allows a user to easily access clips (160, 162). The depth of attachment bracket plate (164) offsets clips (160, 162) and plate (120) from the wall on which the track is installed (not shown) sufficiently to allow for installation of chock assembly (100) which may require that the top of the chock assembly be tipped slightly towards the wall.

When clips (160, 162) are inserted into a slot (not shown) to engage the track (not shown) they engage retainers (166, 168) to keep clips (160, 162) locked in place. The upper notches in the clips are deeper than the lower notches. To insert clips (160, 162) into the slots in the track (not shown) retainers must be displaced away from the track. With retainers displaced clips (160, 162) can be moved into the slots in the track (not shown). Releasing retainers prevents clips (160, 162) from moving superiorly. By inhibiting upward motion clips (160, 162) are prevented from disengaging.

To disengage chock assembly (100) from the track (not shown) retainers (166, 168) are again displaced. With retainers (166, 168) displaced clips (160, 162) can be moved superiorly and removed from the slots in the track (not shown). Thus, the chock assembly can easily and quickly be removed and repositioned as desired along the length of the track (not shown).

Figure 9:
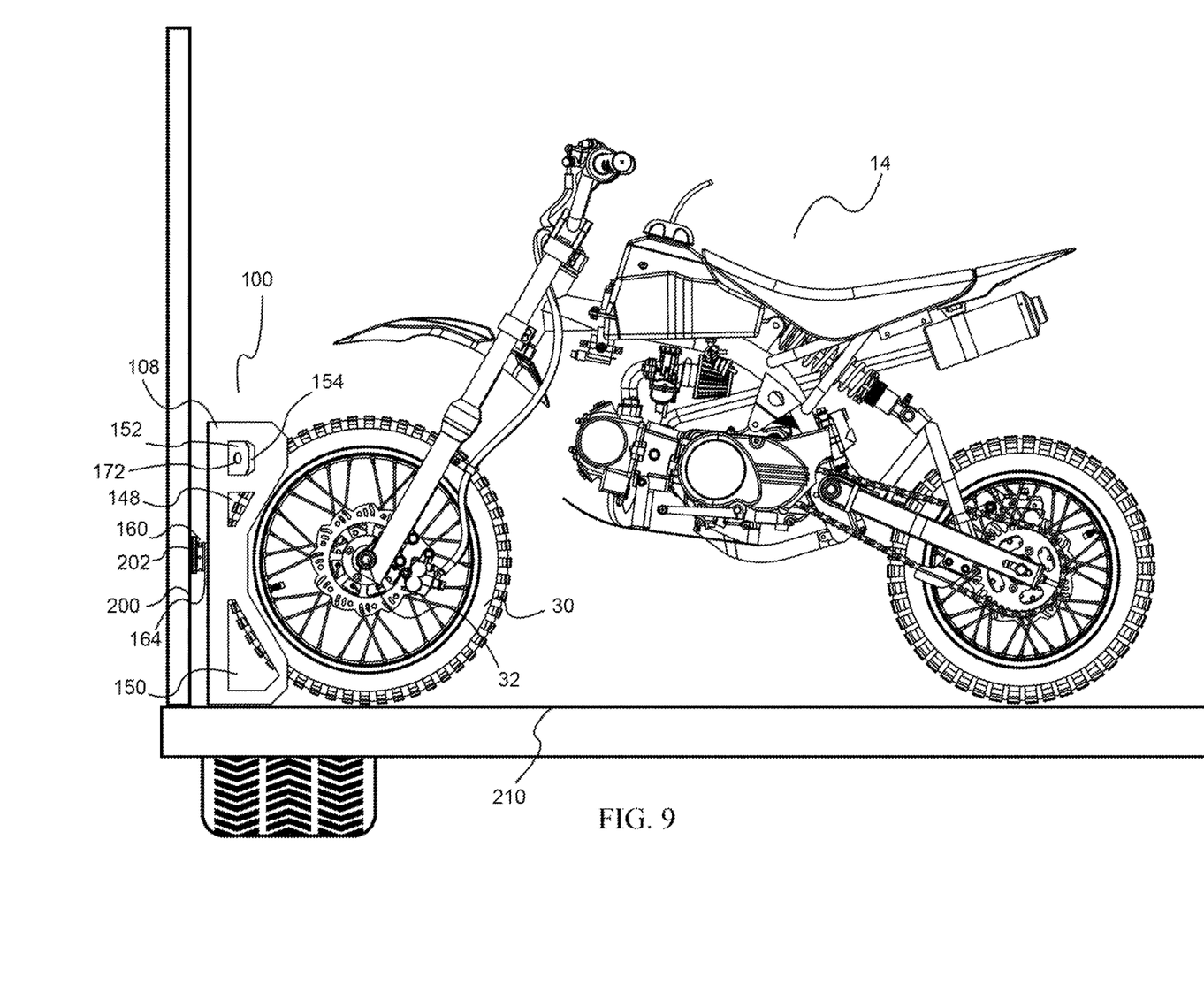
FIG. 9 is a side view of a chock system according to an exemplary embodiment described herein.

Turning to FIG. 9 the exemplary embodiment of FIGS. 3-8 is shown installed in an enclosed trailer and engaging motorcycle (14). In use, left wing (108) and right wing (not shown) of chock (100) surround front motorcycle wheel (30) both above and below front axle (32). Engaging front motorcycle wheel (30) both above and below front axle (32) provides for stability during transportation that inhibits tipping of motorcycle (14) either to the left or to the right.

Interior trailer wall (200) has track (202) installed allowing attachment plate (164) to engage track (202) utilizing clip (160). Left wing (108) of chock (100) includes left upper cut out (148) and left lower cut out (150). Left wing (108) also includes left tab (152) which includes opening (154). Left tab (152) accommodate stabilizing straps (not shown) to further stabilize motorcycle (14) in transit.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A chock system comprising: a left wing portion; a right wing portion; a plate portion, each of said left wing, right wing, and plate portions define a substantially planar member, wherein said left wing portion and said right wing portion are spaced apart by said plate portion in order to receive and engage a motorcycle at a motorcycle wheel both above and below an axle of said motorcycle wheel; and, an attachment bracket including a left clip and a right clip, wherein said clips are engaged to a track such that said motorcycle is secured in a substantially upright position and such that tipping during transportation is substantially inhibited, and such that said plate portion is offset a predetermined amount from said track such that said chock system may be tipped towards said track, and wherein said track includes a number of slots incorporated therein, said slots being adapted to engage said left clip and said right clip of said chock system, and wherein said track is mounted on a front wall of a pickup truck bed box and wherein said chock system is adapted to be installed between a pair of said slots.

2. The chock system according to claim 1 further comprising: a left tab portion angled out from said left wing portion; and, a right tab portion angled out from said right wing portion wherein said left tab portion and said right tab portion allow for attachment of restraints.

3. The chock system of claim 1 wherein said attachment bracket is positionally reconfigurable relative to said plate portion.

* * * * *